No. 646,833. Patented Apr. 3, 1900.
P. A. HOVEN.
CART.
(Application filed June 20, 1899.)

(No Model.)

WITNESSES:
D. E. Carlsen.
E. C. Carlsen

INVENTOR:
Peter A. Hoven.
BY his ATTORNEY.
A. M. Carlsen.

THE NORRIS PETERS CO., PHOTO-LITHO., WASHINGTON, D. C.

UNITED STATES PATENT OFFICE.

PETER A. HOVEN, OF MADISON, MINNESOTA.

CART.

SPECIFICATION forming part of Letters Patent No. 646,833, dated April 3, 1900.

Application filed June 20, 1899. Serial No. 721,194. (No model.)

*To all whom it may concern:*

Be it known that I, PETER A. HOVEN, a citizen of the United States, residing at Madison, in the county of Lac-qui-Parle and State of Minnesota, have invented certain new and useful Improvements in Carts; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in carts; and the objects of my invention are, first, to provide a novel cart adapted to be propelled and steered by the rider or drawn by horses or other animals when so desired; second, to provide a cart capable of traveling through a considerable depth of water, or even traveling on the water like a boat with paddle-wheels on the sides, and, third, to provide a two-wheeled cart adapted to be propelled and steered by its ground-wheels. These and other objects I attain by the novel construction and arrangement of parts illustrated in the accompanying drawings, in which—

Figure 1:
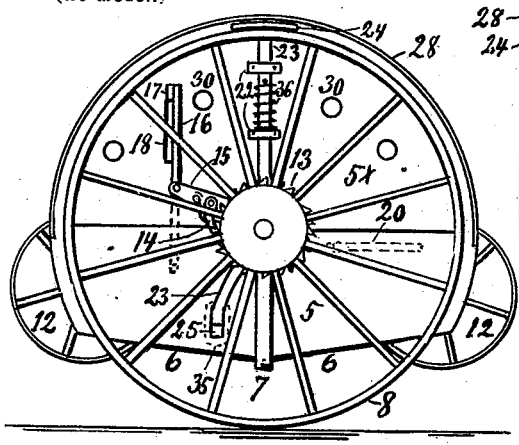
Figure 3:
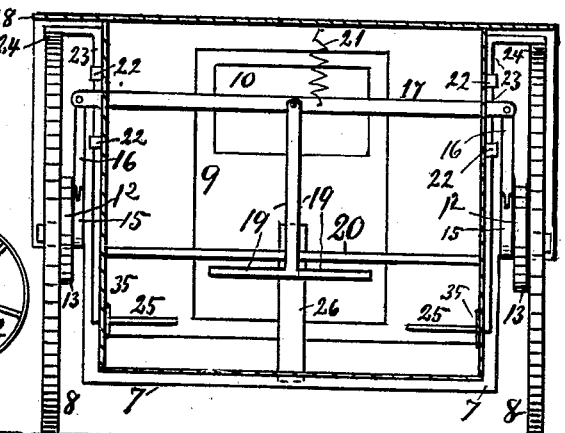
Figure 2:
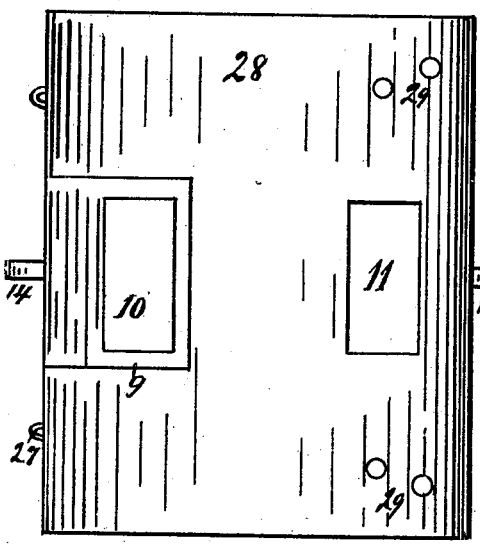
Figure 4:
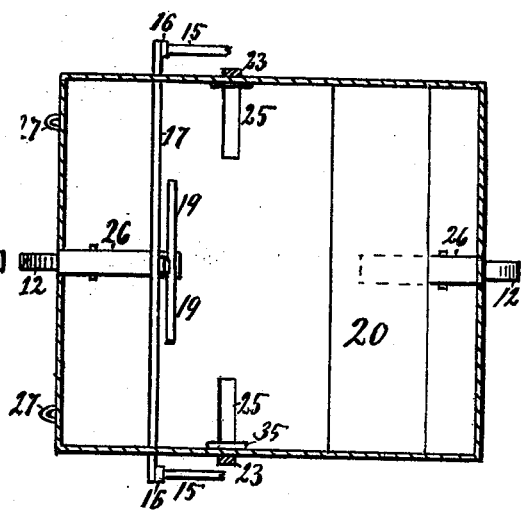

Figure 1 is a side elevation of my complete cart, omitting only the hoods 26, shown in Figs. 3 and 4. Fig. 2 is a top view of Fig. 1. Fig. 3 is a left-hand end view of Fig. 1, with the body of the cart in about central vertical section and the springs 36 omitted. Fig. 4 is a top view of the interior of the cart-body, which is shown in about central horizontal section.

Referring to the various parts in the views by reference-numerals, 5 5$^\times$ is the almost cylindrical body of the cart, its only flat portion being the bottom 6 and the sides. This box or body 5 rests and is secured upon the downwardly-offset axle 7, which is journaled with its ends in the two ground-wheels 8.

The cart is provided in the rear with the door 9, having the glass panel 10 in it, and in the front with the window 11 for the rider to look through upon the road he is driving. These glasses and the door may be of any desired shape and size, and the door may be at the front end of the cart, if so preferred.

The lower portion of the cart-body is supposed to be heavy enough to keep the body in its proper position, as shown in Fig. 1. Should, however, a strong wind blow suddenly against one end of the cart or should the cart by a sudden stoppage tilt some on its large wheels, one of the safety-wheels 12 will touch the ground and prevent the cart from tilting too far.

The lower half, or nearly so, of the cart-body is made water-tight, so that the cart may cross creeks and like shallow waters by riding up to the axle centers of its side wheels, which may be quite large—say five or six feet in diameter—and if the cart is but lightly loaded the wheels 8 need not even touch the bottom, but may simply serve as paddle-wheels for the floating body 5.

To the inner side of each of the ground-wheels 8 is secured a ratchet-wheel 13, upon which operates the spring-pressed pawl 14, pivoted on the lever 15, which is journaled upon the main axle 7 and has its swinging end connected by the rod or link 16 to the end of the horizontal bar 17, the ends of which project out of vertical slots 18 (see Fig. 1) in the sides of the cart, while the bar itself crosses the interior of the cart and is provided with a central stirrup 19, so that the operator, who takes his position on the seat 20, may operate the stirrup with one or both of his feet and the bar 17 with his hands.

21 is a spring to keep the bar 17 normally in an elevated position.

At each side of the cart-body slides in guides 22 a rod 23, which at its upper end carries a brake-shoe 24, adapted to press upon the face of the ground-wheels 8, and the lower end of the bar is provided with a step or stirrup 25, extending inward through a vertical slot 26 in the side of the cart-body.

35 is a sliding leather or rubber pad to keep the slot water-tight.

36 is a spring to keep the brake normally off the wheel.

From the above arrangement it will be seen that the operator may steer the cart by retarding one of the wheels 8 by placing one of his feet on one of the brake-stirrups 25, and thus cause the rod 17 to swing up and down with only one end, or at least to swing more with one end than the other. On even or level ground the rod 17 may also be unevenly operated without the assistance of the brakes upon the wheels. The brakes are more applicable in going down grades. The brakes serve, of course, also the regular purpose of retarding and stopping the whole cart when so desired.

26 are hoods covering the safety-wheels 12, which during all ordinary use of the cart are suspended from the ground, as shown in Fig. 1.

The cart is especially adapted for use by hunters, explorers, prospectors, and tourists of various kinds. If the operating ground is far away, the cart may be drawn to its main destination by draft-animals hitched to the staples 27. The roof 28 of the cart is preferably made to overhang the ground-wheels and mechanism outside the side walls. The roof and the side walls may be provided with rifle-holes 29 and 30, so that the hunter may shoot from inside the cart without exposing himself to the game.

Having thus described my invention, what I claim, and desire to secure by Letters Patent, is—

In a cart of the kind described, the combination with the downwardly-offset axle 7, of the two ground-wheels 8 journaled on the ends thereof, the ratchet-wheels 13 secured to each ground-wheel, the levers 15 journaled on the shaft and having the pawls 14 engaging the ratchet-wheels, the links 16 secured to the pawl-levers, the horizontal bar 17 crossing the cart and having its ends pivotally secured to said links, a stirrup suspended from near the middle of the bar 17, and a spring, 21, for holding the bar 17 and its connections normally elevated, and suitable brakes for braking either or both wheels, substantially as and for the purpose set forth.

In testimony whereof I affix my signature in presence of two witnesses.

PETER A. HOVEN.

Witnesses:
SAMUEL CARSON,
J. E. WALSETH.